United States Patent Office 2,781,182
Patented Feb. 12, 1957

2,781,182
AERODYNAMIC AIRCRAFT CONTROL SYSTEM

Frederick W. Ross, Dearborn, Mich.

Application April 14, 1952, Serial No. 282,110

12 Claims. (Cl. 244—83)

This invention relates to airplanes, and more particularly, to aerodynamic control system therefor including roll, yaw and pitch controls having improved characteristics which reduce the skill required to pilot an airplane and also which minimize the dangers of piloting an airplane.

All airplanes, in order to be maneuvered while flying and during takeoff and landing, have devices to control the angular position of the airplane with respect to the surrounding air and the ground. Such devices are known collectively in the art as aerodynamic controls, and when used in conjunction with the engine controls, provide means for guiding the airplane through all maneuvers.

The aerodynamic control system constituting the incident invention consists of three principal control elements known by those skilled in the art as a roll control element, such as an aileron, to control the roll angle of the airplane, a yaw control element, such as a rudder, to control the yaw angle of the airplane, and a pitch control element, such as an elevator, to control the pitch angle or angle of attack of the airplane with respect to the oncoming air.

In maneuvering an airplane by the conventional independent aerodynamic controls in conjunction with the engine controls, it is necessary for the pilot to co-ordinate properly the amount of and the time of application of each control during each instant of each maneuver. In particular for co-ordination of the roll control with the yaw control, which is necessary in order to perform a true-banked or properly co-ordinated turn, considerable skill and much practice is required on the part of the pilot, it is difficult to master, and has been a source of danger, the pilot often failing to co-ordinate properly at a time when the dangers of a stall and a spin are imminent.

In addition, for side slipping and for crosswind landings, it is necessary to handle the controls in a manner opposite to that required for the usual co-ordination. It is particularly important that this cross-control operation be performed with the proper co-ordination because it must be performed at low altitude during landing where a pilot error would be dangerous.

Control systems other than the conventional mechanically independent type have been devised previously in an effort to simplify these control operations. Such systems include (1) some type of coupling between the roll control element and the yaw control element, (2) a roll control element only, without any yaw control element, (3) a coupling between roll and yaw control elements with some kind of overriding system on the rudder control element. All of these previous systems either limit the control operation and hence increase the danger of flying rather than reduce it or involve some other co-ordination to be performed by the pilot which is of about the same or more complexity than for the conventional mechanically independent systems.

The present invention aims to improve the characteristics of aerodynamic control systems so as to reduce the required skill of the pilot, to reduce the time required to teach the pilot, and to reduce the dangers of piloting an airplane.

One object of the invention is to provide an aerodynamic control system having means for automatic co-ordination of roll control with the yaw control in combination with an improved independent side slip control.

Another object is to provide an aerodynamic control system which requires simpler operational procedures on the part of the pilot and which has improved performance and safety.

Other objects and advantages of the invention will become apparent during the course of the following description of the accompanying drawings, wherein.

Figure 1:
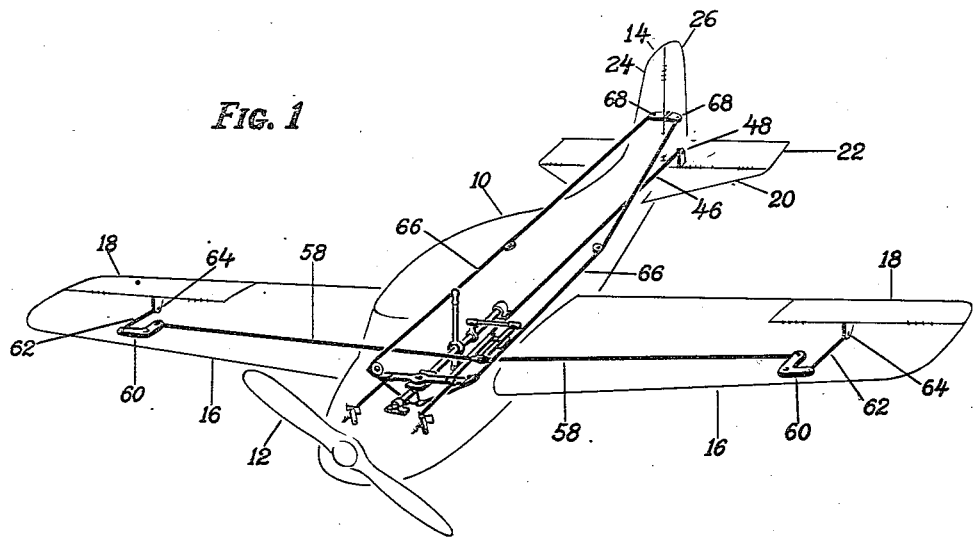
Figure 1 is a perspective view of an airplane illustrating the system as installed.
Figure 2:
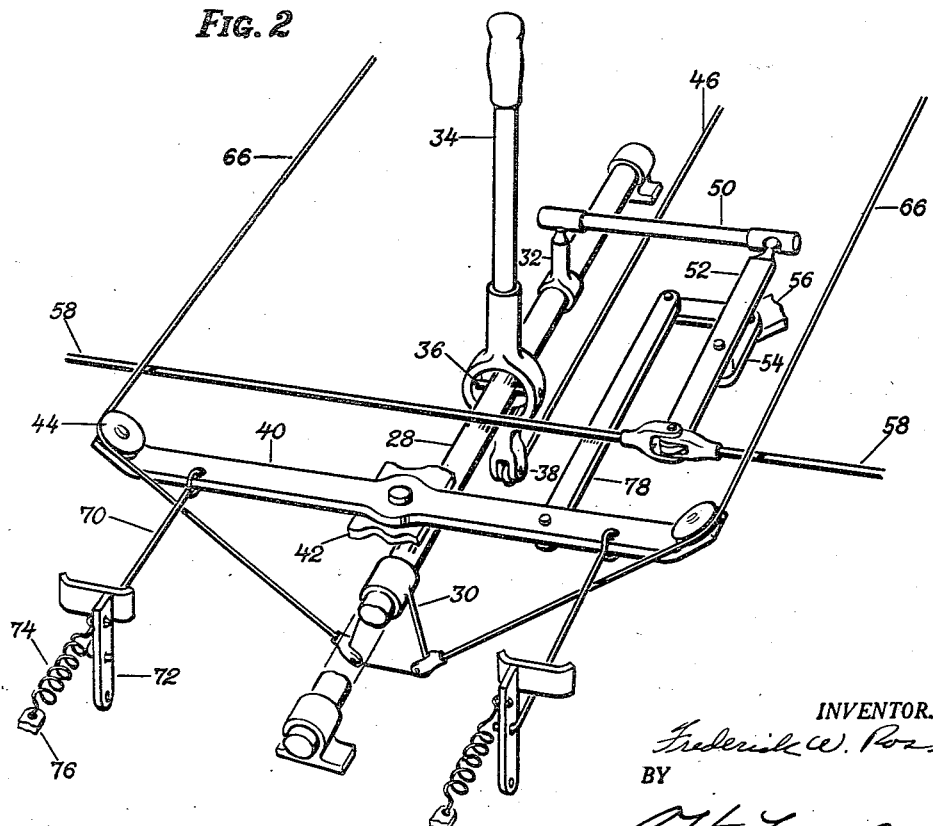
Figure 2 is a diagrammatic perspective view of the system.

The present application, as regards Figures 1 and 2 herein, includes in its entirety the subject matter of my abandoned application, Ser. No. 122, 793, filed October 21, 1949, for Airplane Control System.

Referring to the drawings for more specific details of the invention, 10 represents a fuselage having suitable housing facilities for a pilot and passengers, and also suitable housing for a power plant, not shown, for driving a propeller 12. The fuselage also carries conventional empennage 14.

Oppositely disposed wings 16 of like structure are secured to the fuselage and ailerons 18 are hinged to the trailing edges of the wings, and the wings support a main landing gear (not shown), preferably of the retractable type.

The empennage consists of conventional fixed horizontal surfaces 20 arranged in oppositely disposed relation with corresponding movable elevator surfaces 22 hinged to the trailing edges thereof, and a fixed vertical fin 24 with a movable rudder 26 hinged to the trailing edge of the fin.

A torque tube or member 28 suitably supported for rotation in the fuselage 10 has fixedly secured thereto an arm 30, an arm 32, and a control stick or member 34 is pivotally supported on the torque tube as by pin 36. The stick 34 has a dependent arm 30. The control stick may be swung fore and aft on the pivot pin 36 or moved laterally in either direction so as to rotate the torque tube on its axis.

A cross bar or member 40 pivoted on a fixed member 42 of the main frame of the fuselage supports a pair of sheaves 44 arranged in spaced relation to one another and to the pivotal axis of the cross bar. The dependent arm 38 of the control stick 34 is connected by a push-pull rod 46 to a horn 48 fixedly secured to the elevator 22 so that fore and aft movements of the control stick will deflect the elevator.

The arm 32 on the torque tube 28 is connected by a push-pull rod 50 to one end of a lever 52, the latter being pivotally supported on one arm of a bell crank 54, substantially in the mean position as shown, and the bell crank in turn is pivotally supported on a fixed member 56 of the main frame of the fuselage. The other end of the lever 52 is connected as by corresponding oppositely-extended push-pull rods 58 to one arm of corresponding oppositely-arranged bell cranks 60 pivotally mounted on the frame structures of the wings 16, and the other arms of the bell cranks 60 are connected as by rods or links 62 to horns 64 fixedly secured to the ailerons 18.

The arm 30 is connected as by corresponding cables 66 mounted for travel on the sheaves 44 supported on the cross bar 40 to a horn 68 fixedly secured to the rudder 26; the oppositely disposed ends of the cross bar 40 are connected as by rods 70 to conventional foot pedal levers 72 and retractile springs 74 connected between the pedals and fixed supports 76 serve to return the pedals to retracted position.

The remaining arm of the bell crank 54 is connected to one end of the push-pull rod 78 substantially as shown and the other end of the rod 78 is pivotally connected to the cross bar 40 at a point suitably spaced in relation to the pivotal axis of the cross bar.

The control system of this invention is operative in the following manner:

By movement of the control stick 34 to the right, for example, torque tube 28 is rotated and arm 32 causes push-pull rod 50 to be moved to the right. This in turn causes lever 52 to rotate about its pivot which is mounted on bell crank 54.

With the bell crank 54 held in position, as described, hereinafter, the lever 52 causes the rods 58 to be moved so as to deflect the trailing edge of the right aileron up and the left aileron down from their normal positions. Simultaneously to this deflection of the ailerons, the right motion of the control stick moves the arm 30 and pulls on the cable 66. With the cross bar 40 and hence the sheaves 44 held in position, cable 66 causes the trailing edge of the rudder to be deflected to the right of its normal position. These control deflections are in a direction to produce a banked turn of the airplane to the right and when the magnitudes of deflections are correctly apportioned, the turn will be approximately a true-banked turn.

It is seen that the aileron aerodynamic load and the control mechanism friction will react to tend to hold the forward end of the lever 52 fixed. Motion of this rod 50 to the right along its axis will tend to rotate the bell crank 54 so as to move the rod 78 aft. This reaction tends to rotate the left side of the cross bar 40 aft. Simultaneous to this effect, the rudder air load and friction through the cable 66 react on the sheave on the right end of the cross bar 40 tending to rotate the right side of the cross bar 40 aft. Thus the reactions on bell crank 54 and cross bar 40 act against each other so that both are held in position with a minimum of friction force, such as usually exists in the bearings of the mechanism. Consequently, right and left motions of the control stick produce positive deflections of the ailerons and rudder without requiring the pilot to hold the foot pedal against the movement and without the use of added devices incorporating elastic, spring, or friction to provide the entire reaction to inhibit movement of the cross bar 40, rod 78 and foot pedal 72. Motion of the control stick to the left will produce a banked turn of the airplane to the left with all deflections and reactions being opposite to those just described.

Forward movement of the right foot pedal moves the sheave 44 on the right side forward and with arm 30 held in position by holding the stick 34, the cable 66 is pulled forward, thus deflecting the rudder trailing edge to the right of its normal position. Simultaneously, the aft motion of the left side of the cross bar 40 moves the rod 78 aft and rotates the bell crank 54 to move the pivot of the lever 52 to the right. With the lever 50 held in position, also by holding the stick 34, the rods 58 are moved to the right, thus deflecting the trailing edge of the left aileron up and the right aileron down from their normal positions. It is to be noted that the reactions necessary to hold the arm 30 and rod 50 in postion tend to counteract each other through the torque tube 28 so that the stick 34 is held in position with a minimum of friction force, such as often exists in the bearings of the mechanism. It is unnecessary for the pilot to provide the reaction by holding the control stick, and the use of elastic, spring or friction devices to provide the entire reaction is unnecessary.

Upon movement of the right foot pedal forward, the deflection of the rudder and ailerons as described will produce a cross-controlled side slip of the airplane with the nose of the airplane to the right and the right wing high, merely by the use of a single simple control movement rather than by a simultaneous reversed co-ordination of two separate controls as is necessary in a conventional control system. Forward movement of the left foot pedal will produce opposite deflections and reactions to those just described.

The magnitudes of the relative deflections of ailerons and rudder can be apportioned so that for small movements of one of the foot pedals, the ailerons essentially only cancel out the roll due to side slip of the airplane, thus providing a simpler yaw trimming device. For larger deflections of one of the foot pedals, the ailerons cause more bank than this and introduce the necessary bank for a side slip which is useful in side slipping for glide control and for cross wind landings.

The aerodynamic control system of this invention makes it possible to operate the aerodynamic roll and yaw control elements in unison for making co-ordinated turns merely by pressing one lever, and to operate the same aerodynamic roll and yaw control elements in unison properly for making side slips by merely pressing another single lever, the two operations being independent of each other and requiring no close co-ordination. This aerodynamic control system, therefore, has the advantages of simplicity and safety, of what is termed a "two-control" system by those skilled in the art, in addition to having the advantage of making it possible to perform such maneuvers as side slip and cross wind landings more precisely and with less skill required by the pilot than for previously known systems.

The inclusion of a differential mechanism or means in the means connecting the roll control element to the control lever as well as a second differential mechanism or means in the rudder linkage is believed to be new and novel. When incorporated into a rudder-aileron coupled control system as herein described, it is possible for the pilot to side slip the airplane by merely pressing the foot pedal, there being no necessity for him to compensate any roll action as by the control stick such as will be introduced as by a system incorporating only a single differential mechanism on the rudder linkage only.

In addition to this simplicity, another advantage of the system described is that the mechanism for overriding the aileron coupling is arranged to react with the mechanism for overriding the rudder coupling so that operation of the coupled aileron-on-rudder system as for making a turn by application of the stick control or as for side slipping by application of the pedal control requires no reactive force by the pilot on either control. The advantage of complete independence, as obtained by the system described, of these control operations is readily recognized when considered in view of the complexities of piloting an airplane. Furthermore, these extreme simplifications of the control operations are obtained without restriction of control deflections in any way.

The inclusion of a means for compensating the roll due to side slip which is caused by operation of an overriding auxiliary yaw control included in conjunction with a control system having the roll and yaw controls operable from a single primary control lever, and for providing the necessary bank for side slip is believed to be novel.

Differential overriding devices incorporating friction, springs or elastic to provide the reaction necessary to separate the double control actions needed may be substituted for the mechanisms described.

Further advantages and improved control and performance may be obtained by utilizing in conjunction with the present invention a mechanism incorporating in the linkage which connects the control stick to the rudder and ailerons for the operation of performing a banked-turn, a variable ratio of rudder control to aileron control (rather than an essentially constant ratio as herein described) wherein the variable ratio is adjusted by the pitch control setting as described in my co-pending application for Letters Patent for improvements in an Airplane Control System, filed November 28, 1947 under Serial No. 788,341 which subsequently became U. S. Patent No. 2,611,563 of September 23, 1952.

It will be evident that it is optional with the designer whether the control system of the present invention employs foot pedals with a control stick as in Figures 1 and 2, hand levers, or a hand wheel, or whether it employs motion-transmitting cables as in Figures 1 and 2 or rods.

What I claim is:

1. In an aircraft having a frame and equipped with an aerodynamic yaw element and a pair of spaced oppositely-movable roll elements, an aerodynamic control system comprising a primary control member, a secondary control member, a first motion-transmitting device operatively connecting said primary control member to said roll elements and simultaneously moving said roll elements in opposite directions, and a second motion-transmitting device operatively connecting said secondary control member to said yaw element, said first motion-transmitting device including a differential mechanism unit, said differential mechanism unit including a first lever pivotally mounted on said frame and operatively connected to one of said control members, said first motion-transmitting device including a second lever pivotally mounted on said first lever and operatively connected to the other of said control members.

2. In an aircraft having a frame and equipped with an aerodynamic yaw element and a pair of spaced oppositely-movable roll elements, an aerodynamic control system comprising a primary control member, a secondary control member, a first motion-transmitting device operatively connecting said primary control member to said roll elements and simultaneously moving said roll elements in opposite directions, a second motion-transmitting device operatively connecting said secondary control member to said yaw element, and a pair of differential mechanism units operatively connected to one another and to said control members, one of said units including a first lever pivotally mounted on said frame, said first motion-transmitting device including a second lever pivotally mounted on said first lever at a location spaced away from the pivotal mounting thereof on said frame, said first lever being operatively connected to said secondary control member and said second lever being operatively connected to said primary control member as a part of said first motion-transmitting device.

3. In an aircraft having a frame and equipped with an aerodynamic yaw element and a pair of spaced oppositely-movable roll elements, an aerodynamic control system comprising a primary control member, a secondary control member, a first motion-transmitting device operatively connecting said primary control member to said roll elements and simultaneously moving said roll elements in opposite directions, a second motion-transmitting device operatively connecting said secondary control member to said yaw element, and a pair of differential mechanism units operatively connected to one another and to said control members, one of said units including a first lever pivotally mounted on said frame and a second lever pivotally mounted on said first lever at a location spaced away from the pivotal mounting thereof on said frame, said first lever being operatively connected to said secondary control member and said second lever being operatively connected to said primary control member and to said first motion-transmitting device, the other of said units including a rocking member pivotally mounted on said frame and operatively connected to the first-mentioned unit.

4. In an aircraft having a frame and equipped with aerodynamic roll and yaw elements, an aerodynamic control system comprising a primary control member, a secondary control member, a first motion-transmitting device operatively connecting said primary control member to said roll element, a second motion-transmitting device operatively connecting said secondary control member to said yaw element, and a pair of differential mechanism units operatively connected to one another and to said control members, one of said units including a first lever pivotally mounted on said frame, said first motion-transmitting device including a second lever pivotally mounted on said first lever at a location spaced away from the pivotal mounting thereof on said frame, said first lever being operatively connected to said secondary control member and said second lever being operatively connected to said primary control member as a part of said first motion-transmitting device, the other of said units including a rocking member pivotally mounted on said frame and carrying a pair of rotary guide elements, said second motion-transmitting device including a flexible motion-transmitting member operatively connected to said primary control member and engaging said rotary guide elements.

5. In an aircraft having a frame and equipped with an aerodynamic yaw element and a pair of spaced oppositely-movable roll elements, an aerodynamic control system comprising a rotatable element disposed longitudinally in said aircraft, a primary control member connected to said rotatable element and swingable laterally therewith, a first motion-transmitting device operatively connecting said rotatable element to said roll elements and simultaneously moving said roll elements in opposite directions, a secondary control member, a second motion-transmitting device operatively connecting said secondary control member to said yaw element, and a pair of differential mechanism units operatively connected to one another and to said control members, one of said units including a first lever pivotally mounted on said frame, said first motion-transmitting device including a second lever pivotally mounted on said first lever at a location spaced away from the pivotal mounting thereof on said frame, said first lever being operatively connected to said secondary control member and said second lever being operatively connected to said primary control member as a part of said first motion-transmitting device.

6. In an aircraft having a frame and equipped with an aerodynamic yaw element and a pair of spaced oppositely-movable roll elements, an aerodynamic control system comprising a rotatable element disposed longitudinally in said aircraft, a primary control member connected to said rotatable element and swingable laterally therewith, a first motion-transmitting device operatively connecting said rotatable element in said roll elements and simultaneously moving said roll elements in opposite directions, a secondary control member, a second motion-transmitting device operatively connecting said secondary control member to said yaw element, and a pair of differential mechanism units including parts of said motion-transmitting devices operatively connected to one another and to said control members, one of said units including a rocking member pivotally mounted on said frame and operatively connected to the other unit.

7. In an aircraft having a frame and equipped with an aerodynamic yaw element and a pair of spaced oppositely-movable roll elements, an aerodynamic control system comprising a rotatable element disposed longitudinally in said aircraft, a primary control member connected to said rotatable element and swingable laterally therewith, a first motion-transmitting device operatively connecting said rotatable element to said roll elements and simultaneously moving said roll elements in opposite directions, a secondary control member, a second motion-transmitting device operatively connecting said secondary control member to said yaw element, and a pair of differential mechanism units operatively connected to one another and to said control members, one of said units including a first lever pivotally mounted on said frame, said first motion-transmitting device including a second lever pivotally mounted on said first lever at a location spaced away from the pivotal mounting thereof on said frame, said first lever being operatively connected to said secondary control member and said second lever being operatively connected to said primary control member as a part of said first motion-transmitting device, the other of said units including a rocking member pivotally mounted on said frame and operatively connected to the first-mentioned unit.

8. In an aircraft having a frame and equipped with an aerodynamic yaw element and a pair of spaced oppositely-movable roll elements, an aerodynamic control system comprising a rotatable element disposed longitudinally in said aircraft, a primary control member connected to said rotatable element and swingable laterally therewith, a first motion-transmitting device operatively connecting said rotatable element to said roll elements and simultaneously moving said roll elements in opposite directions, a secondary control member, a second motion-transmitting device operatively connecting said secondary control member to said yaw element, and a pair of differential mechanism units operatively connected to one another and to said control members, one of said units including a first lever pivotally mounted on said frame, said first motion-transmitting device including a second lever pivotally mounted on said first lever at a location spaced away from the pivotal mounting thereof on said frame, said first lever being operatively connected to said secondary control member and said second lever being operatively connected to said primary control member as a part of said first motion-transmitting device, the other of said units including a rocking member pivotally mounted on said frame and carrying a pair of rotary guide elements, said second motion-transmitting device including a flexible motion-transmitting member operatively connected to said rotatable element and engaging said rotary guide elements.

9. In an aircraft, an aerodynamic control system comprising a mechanism interconnecting an aerodynamic roll control to an aerodynamic yaw control, the aerodynamic roll control being interconnected to a primary control member through means including a lever pivotally mounted on a lever which latter is interconnected through suitable means to a secondary control member; the aerodynamic yaw control being interconnected to the same primary control member through means including a cable passing over sheaves mounted on the secondary control member, the mechanism being such that upon movement of the secondary control member the reaction of the aerodynamic roll control on the primary control member opposes the reaction of the aerodynamic yaw control on the same primary control member and such that upon movement of the primary control member the reaction of the aerodynamic roll control on the secondary control member opposes the reaction of the aerodynamic yaw control on the same secondary control member.

10. In an aircraft having an aerodynamic yaw element and a pair of spaced oppositely movable roll elements, controls for said elements, and means for actuating the controls including a rockable member, means for rocking the member, a fixed support, a bell crank pivoted thereon, a lever pivoted on one arm of the bell crank, means connecting one end of the lever to the rockable member, means connecting the other end of the lever to the roll elements, means connecting the other arm of the bell crank to the yaw element, and manual means connected to said last-mentioned means for overriding movement of the yaw element by the rockable member.

11. In an aircraft having an aerodynamic yaw element and a pair of spaced oppositely-movable roll elements, controls for said elements, and means for actuating the controls including a rockable member, means for rocking the member, a fixed support, a bell crank pivoted thereon, a lever pivoted on one arm of the bell crank, linkage connecting one end of the lever to the rockable member, linkage connecting the other end of the lever to the roll element controls, linkage connecting the other arm of the bell crank to the yaw element and manual means connected to said last-mentioned linkage for overriding movement of the yaw element by the rockable member.

12. In an aircraft having aerodynamic roll, yaw and pitch controls, means for actuating the controls including a rockable member, a control stick pivoted thereon for movement forward and backward and for rocking the member, means connecting the control stick to the pitch control, a fixed support, a bell crank pivoted on the fixed support, a lever pivoted on one arm of the bell crank, linkage connecting one end of the lever to the rockable member, linkage connecting the other end of the lever to the roll control, a rockable cross-bar, a rod connecting the other arm of the bell crank to the cross-bar, a sheave on each end of the cross-bar, an arm on the rockable member, and cables connected to the arm on the rockable member passed over the sheaves and connected to the yaw control.

References Cited in the file of this patent

UNITED STATES PATENTS

| | | |
|---|---|---|
| 2,318,833 | Stambach | May 11, 1943 |
| 2,340,237 | Upson | Jan. 25, 1944 |
| 2,442,289 | Gardenhime | May 25, 1948 |
| 2,478,033 | Weick | Aug. 2, 1949 |
| 2,542,946 | Ross | Feb. 20, 1951 |
| 2,579,265 | Lander | Dec. 18, 1951 |
| 2,588,020 | Libby | Mar. 4, 1952 |
| 2,601,458 | Robert | June 24, 1952 |

FOREIGN PATENTS

| | | |
|---|---|---|
| 323,881 | Germany | Aug. 11, 1920 |